United States Patent
Gurav et al.

(10) Patent No.: US 10,846,525 B2
(45) Date of Patent: Nov. 24, 2020

(54) METHOD AND SYSTEM FOR IDENTIFYING CELL REGION OF TABLE COMPRISING CELL BORDERS FROM IMAGE DOCUMENT

(71) Applicant: Wipro Limited, Bangalore (IN)

(72) Inventors: Aniket Anand Gurav, Pune (IN); Rupesh Wadibhasme, Pune (IN); Swapnil Dnyaneshwar Belhe, Pune (IN)

(73) Assignee: Wipro Limited, Bangalore (IN)

( * ) Notice: Subject to any disclaimer, the term of this patent is extended or adjusted under 35 U.S.C. 154(b) by 60 days.

(21) Appl. No.: 16/370,945

(22) Filed: Mar. 30, 2019

(65) Prior Publication Data

US 2020/0265224 A1    Aug. 20, 2020

(30) Foreign Application Priority Data

Feb. 15, 2019    (IN) .............................. 201941006167

(51) Int. Cl.
  *G06K 9/00*    (2006.01)
  *G06K 9/62*    (2006.01)
(52) U.S. Cl.
  CPC ..... *G06K 9/00463* (2013.01); *G06K 9/00449* (2013.01); *G06K 9/6256* (2013.01)
(58) Field of Classification Search
  CPC ............. G06K 9/00463; G06K 9/6256; G06K 9/00449
  See application file for complete search history.

(56) References Cited

U.S. PATENT DOCUMENTS 7,251,349 B2    7/2007  Najman et al.
8,879,846 B2    11/2014  Amtrup et al.
(Continued)

FOREIGN PATENT DOCUMENTS

JP    2009169844 A    7/2009

OTHER PUBLICATIONS

Alexey Shigarov, Andrey Mikhailov, and Andrey Altaev. 2016. Configurable Table Structure Recognition in Untagged PDF documents. In Proceedings of the 2016 ACM Symposium on Document Engineering (DocEng '16). Association for Computing Machinery, New York, NY, USA, 119-122. DOI:https://doi.org/10.1145/2960811.2967152.*

(Continued)

*Primary Examiner* — Neil R McLean
(74) *Attorney, Agent, or Firm* — Finnegan, Henderson, Farabow, Garrett & Dunner, LLP

(57) ABSTRACT

The present disclosure is related to field of machine learning and image processing, disclosing method and device for identifying cell region of table including cell borders from an image document. Table detecting system rescales a primary image document into plurality of secondary image documents of different size and resolution to detect plurality of candidate regions comprising predefined table features in each secondary image document. Further, for each candidate region, set of connected components are determined and the connected components corresponding to the IDs that are present in more than one set of the connected components are clustered. Subsequently, areas corresponding to the clusters that are determined to form a table are cropped from the primary image document and each cell region of the table is identified by modifying pixel values of the clusters of the connected components in the cropped area.

20 Claims, 10 Drawing Sheets

(56) References Cited

U.S. PATENT DOCUMENTS

| | | | |
|---|---|---|---|
| 2011/0249905 A1 | 10/2011 | Singh et al. | |
| 2014/0369602 A1* | 12/2014 | Meier | G06K 9/6218 |
| | | | 382/182 |
| 2016/0055376 A1* | 2/2016 | Koduru | G06F 40/14 |
| | | | 382/176 |
| 2019/0171704 A1* | 6/2019 | Buisson | G06F 40/131 |

OTHER PUBLICATIONS

A. Gilani, S. R. Qasim, I. Malik and F. Shafait, "Table Detection Using Deep Learning," 2017 14th IAPR International Conference on Document Analysis and Recognition (ICDAR), Kyoto, 2017, pp. 771-776, doi: 10.1109/ICDAR.2017.131.*

* cited by examiner

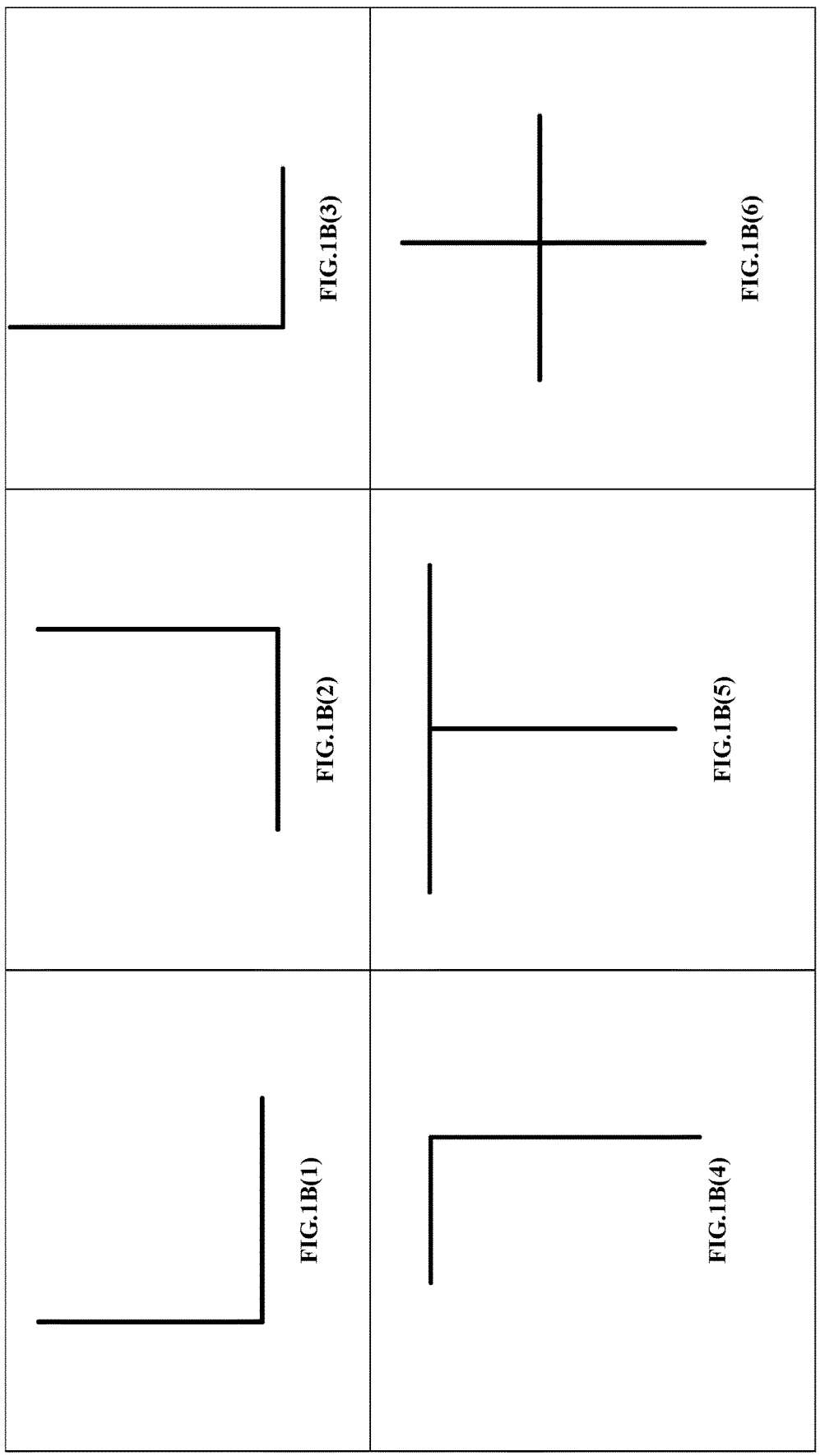

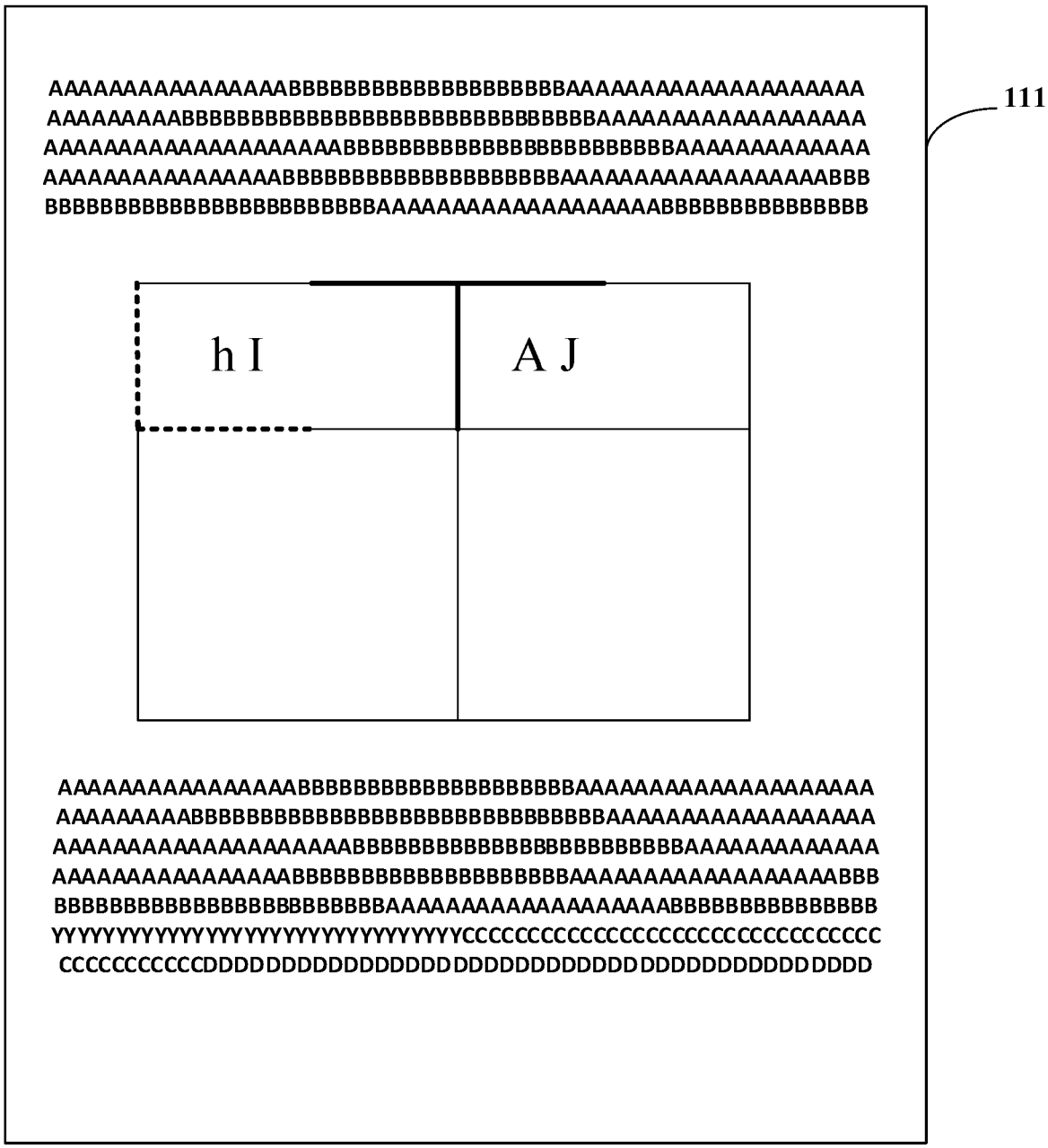
FIG.2B (1)

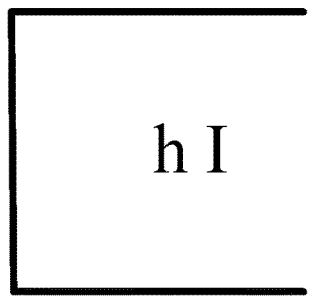
FIG.2B (2)
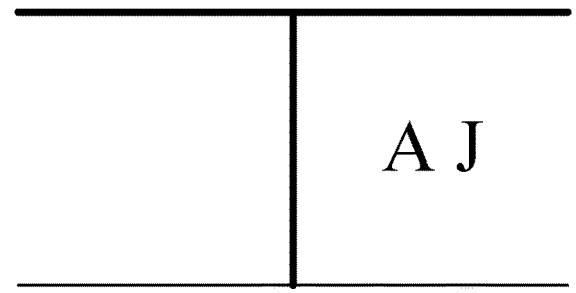
FIG.2B (3)
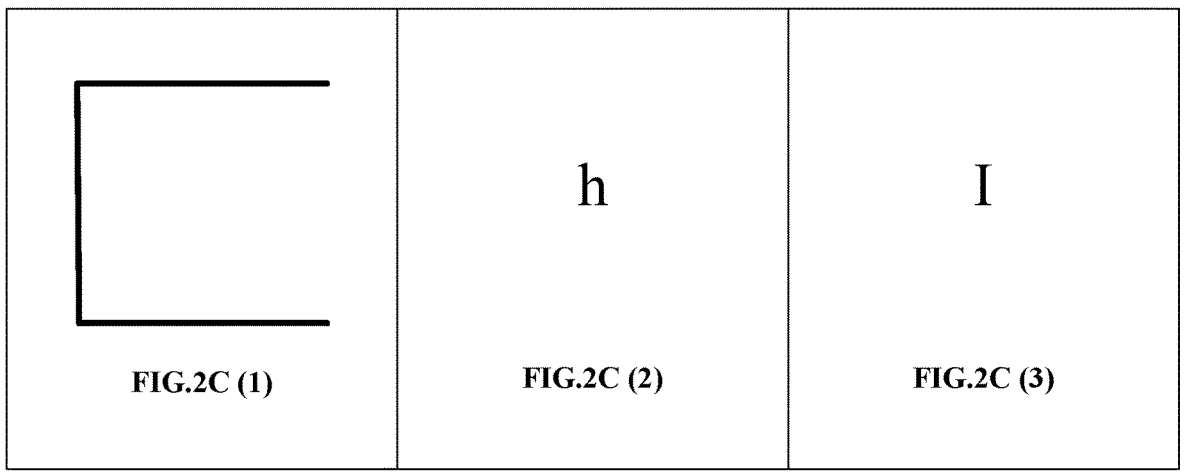
FIG.2C (1)  FIG.2C (2)  FIG.2C (3)
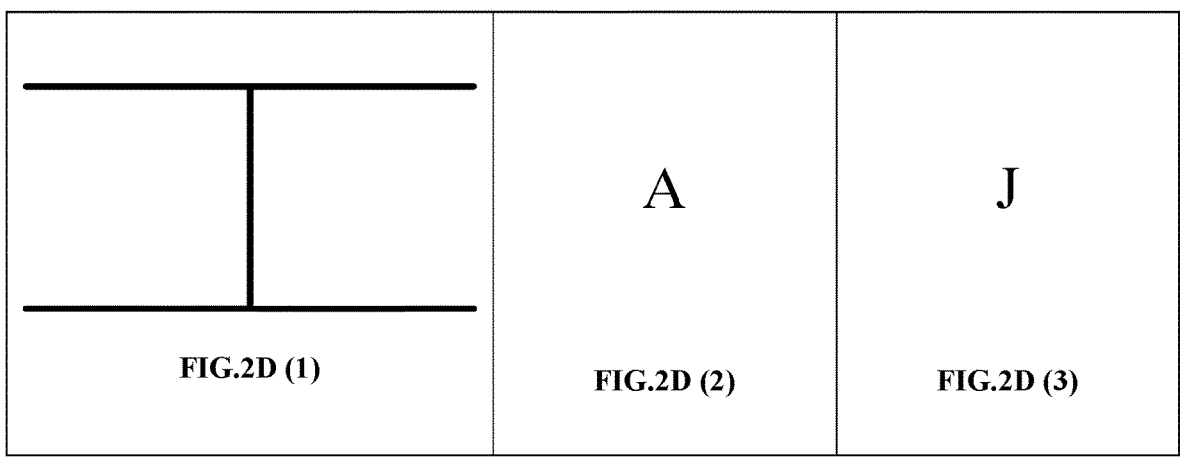
FIG.2D (1)  FIG.2D (2)  FIG.2D (3)

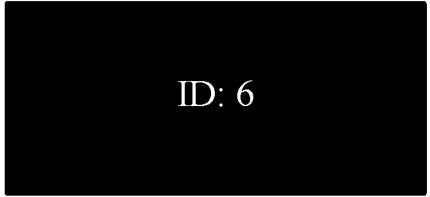
FIG.2G(1)
FIG.2G(2)
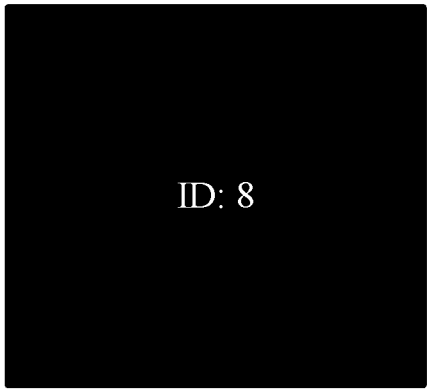
FIG.2G(3)
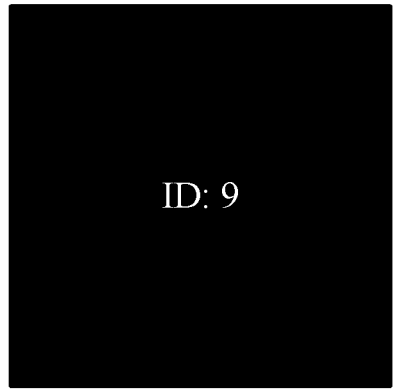
FIG.2G(4)

METHOD AND SYSTEM FOR IDENTIFYING CELL REGION OF TABLE COMPRISING CELL BORDERS FROM IMAGE DOCUMENT

This application claims the benefit of Indian Patent Application Serial No. 201941006167, filed Feb. 15, 2019, which is hereby incorporated by reference in its entirety.

FIELD

The present subject matter is related in general to the field of image processing and machine learning, and more particularly, but not exclusively to a method and a system for identifying cell region of a table comprising cell borders from an image document.

BACKGROUND

Nowadays, information is present in various forms of documents, however not all the information may be in digitized format. The documents such as reports, contracts, publications and the like are generally scanned documents or images which may be converted into the digitized format using Optical Character Reader (OCR) systems. However, challenge arises when the scanned documents or the images comprise text arranged in a table.

A table is generally a structured way of representing information. Each row and column of the table formed by horizontal and vertical lines may contain information which is classified under different headings. Extraction of the information from the tables is complicated as structure and arrangement of cells of the table may vary across the scanned documents and also location of the tables may also vary in the scanned documents.

The OCR systems disclosed in some of the existing techniques are trained to read and extract the normal text from the scanned documents or images. However, when the scanned documents comprise the text in the table, the OCR systems may fail to detect the table and the text present within the table. Few other existing techniques disclose the capability of extracting the text present within the table but fail to maintain relational structure of the table intact. Failing to maintain the relational structure of the table may lead to incorrect arrangement/representation of the information, which may be a huge risk when the information is critical.

SUMMARY

One or more shortcomings of the prior art are overcome, and additional advantages are provided through the present disclosure. Additional features and advantages are realized through the techniques of the present disclosure. Other embodiments and aspects of the disclosure are described in detail herein and are considered a part of the claimed disclosure.

Disclosed herein is a method of identifying cell region of a table comprising cell borders from an image document. The method includes receiving, by a table detecting system, a primary image document from a data source among one or more data sources associated with the table detection system. Upon receiving the primary image document, the method includes generating a plurality of secondary image documents by rescaling the primary image document. Further, a plurality of candidate regions comprising one or more predefined table features in each of the plurality of secondary image documents are detected. The one or more predefined table features include at least one of L-shaped edge, laterally inverted L-shaped edge, elongated L-shaped edge, vertically inverted L-shaped edge, T-junction and an intersection. Further, the method includes determining a set of connected components corresponding to each of the plurality of candidate regions. Each set of the connected components comprises IDs associated with the corresponding connected components and a common ID is associated with the connected components that are interlinked. Furthermore, the method includes generating clusters of the connected components, each cluster includes the connected components corresponding to the IDs that are determined to be present in more than one set of the connected components. Upon generating the clusters, the method includes cropping areas corresponding to the clusters of the connected components, determined to form a table, from the primary image document. The table is determined when the clusters of the connected components satisfy a predefined probability threshold. Finally, the method includes identifying each cell region of the table by modifying pixel values of the clusters of the connected components in the cropped area.

Further, the present disclosure comprises a table detecting system identifying cell region of a table comprising cell borders from an image document. The table detecting system includes a processor and a memory communicatively coupled to the processor. The memory stores the processor-executable instructions, which, on execution, causes the processor to receive a primary image document from a data source among one or more data sources associated with the table detection system. Upon receiving the primary image document, the processor generates a plurality of secondary image documents by rescaling the primary image document. Further, the processor detects a plurality of candidate regions comprising one or more predefined table features in each of the plurality of secondary image documents. The one or more predefined table features include at least one of L-shaped edge, laterally inverted L-shaped edge, elongated L-shaped edge, vertically inverted L-shaped edge, T-junction and an intersection. Further, the processor determines a set of connected components corresponding to each of the plurality of candidate regions. Each set of the connected components comprises IDs associated with the corresponding connected components and a common ID is associated with the connected components that are interlinked. Furthermore, the processor generates clusters of the connected components, each cluster includes the connected components corresponding to the IDs that are determined to be present in more than one set of the connected components. Upon generating the clusters, the processor crops areas corresponding to the clusters of the connected components, determined to form a table, from the primary image document. The table is determined when the clusters of the connected components satisfy a predefined probability threshold. Finally, the processor identifies each cell region of the table by modifying pixel values of the clusters of the connected components in the cropped area.

Further, the present disclosure comprises a non-transitory computer readable medium including instructions stored thereon that when processed by at least one processor causes a table detecting system to perform operations comprising receiving a primary image document from a data source among one or more data sources associated with the table detecting system. Subsequently, the instructions cause the processor to generate a plurality of secondary image documents by rescaling the primary image document. Further, the instructions cause the processor to detect a plurality of candidate regions comprising one or more predefined table features in each of the plurality of secondary image documents. The one or more predefined table features comprises at least one of L-shaped edge, laterally inverted L-shaped edge, elongated L-shaped edge, vertically inverted L-shaped edge, T-junction and an intersection. Furthermore, the instructions cause the processor to determine a set of connected components corresponding to each of the plurality of candidate regions. Each set of the connected components comprises IDs associated with the corresponding connected components and a common ID is associated with the connected components that are interlinked. Subsequently, the instructions cause the processor to generate clusters of the connected components, each cluster comprises the connected components corresponding to the IDs that are determined to be present in more than one set of the connected components. Upon generating the clusters, the instructions cause the processor to crop areas corresponding to the clusters of the connected components, determined to form a table, from the primary image document. The table is determined when the clusters of the connected components satisfy a predefined probability threshold. Finally, the instructions cause the processor to identify each cell region of the table by modifying pixel values of the clusters of the connected components in the cropped areas.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 1B (1)-(6) shows predefined table features in accordance with some embodiments of the present disclosure;

FIG. 2B (1) shows an exemplary secondary image document indicating detected predefined table features in accordance with some embodiments of the present disclosure;

FIG. 2B (2) and FIG. 2B (3) show exemplary candidate regions in accordance with some embodiments of the present disclosure;

FIGS. 2C (1)-(3) show an exemplary set of connected components for a first candidate region in accordance with some embodiments of the present disclosure;

FIGS. 2D (1)-(3) show an exemplary set of connected components for a second candidate region in accordance with some embodiments of the present disclosure;

FIGS. 2G (1)-(4) show exemplary cell regions extracted from an exemplary table in accordance with some embodiments of the present disclosure;

Figure 1A:
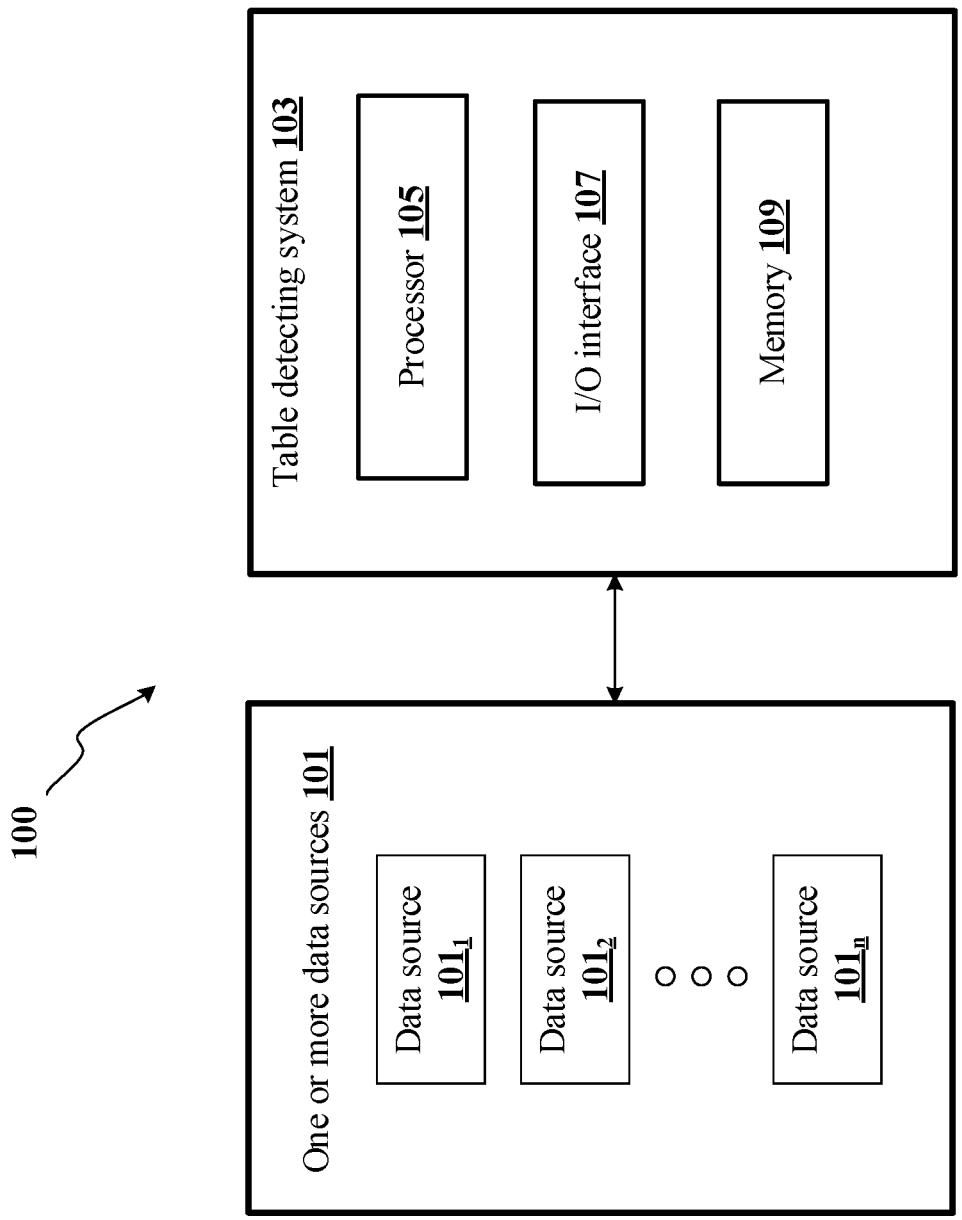
FIG. 1A shows an exemplary architecture for identifying cell region of a table comprising cell borders from an image document in accordance with some embodiments of the present disclosure.

It should be appreciated by those skilled in the art that any block diagram herein represents conceptual views of illustrative systems embodying the principles of the present subject matter. Similarly, it will be appreciated that any flow chart, flow diagram, state transition diagram, pseudo code, and the like represent various processes which may be substantially represented in computer readable medium and executed by a computer or a processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure provides a method and a system for identifying cell region of a table comprising cell borders from an image document. In some embodiments, the cell borders (also referred as outline of rows and columns of the table) forming the table, may be solid line cell borders i.e. border style associated with the cell borders may be "solid line" which includes continuous arrangement of pixels. A table detecting system may initially receive a primary image document. As an example, the primary image document may be a scanned document or a captured document. Further, the table detecting system may rescale the primary image document to generate plurality of secondary image documents. In each of the plurality of secondary image documents, the table detecting system may detect a plurality of candidate regions comprising one or more predefined table features.

The one or more predefined table features comprises at least one of L-shaped edge, laterally inverted L-shaped edge, elongated L-shaped edge, vertically inverted L-shaped edge, T-junction and an intersection. Further, the table detecting system may determine a set of connected components corresponding to each of the plurality of candidate regions. In an embodiment, each set of the connected components may include IDs associated with the corresponding connected components. Further, a common ID may be associated with the connected components that are interlinked.

Upon determining the set of the connected components, the table detecting system may generate clusters of the connected components. In an embodiment, each cluster may include the connected components corresponding to the IDs that are determined to be present in more than one set of the connected components. Upon generating the clusters, the table detecting system may crop areas corresponding to the clusters of the connected components that are determined to form a table, from the primary image document. In an embodiment, existence of the table may be determined when the clusters of the connected components satisfy a predefined probability threshold. The connected components that belong to the clusters satisfying the predefined probability threshold form borders, rows and columns of the table that is determined to exist in the primary image document. Upon determining existence of the table, the table detecting system may identify each cell region of the table by modifying pixel values of the clusters of the connected components in the cropped areas.

The one or more predefined table features disclosed in the present disclosure enable determination of the table of any structure/arrangement, in the scanned document or the image document. Further, the present disclosure discloses detecting the one or more predefined table features in rescaled images, thus ensuring that each part of the scanned document is carefully analysed for detecting the one or more predefined table features. Further, the present disclosure discloses two levels of filtering the detected candidate regions. First level includes discarding the connected components corresponding to the plurality of candidate regions that are not present in more than one set of the connected components, before determining existence of the table. Second level includes discarding the clusters of the connected components whose probability of forming the table is determined to be less than the predefined probability threshold. These two levels of discarding enable accurate detection of the tables present in the scanned documents. Further, the present disclosure extracts the exact region of the table borders, rows and columns, and the cell regions enclosed within the table borders, rows and columns, thereby maintaining relational structure of the table.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1A shows an exemplary architecture for identifying cell region of a table comprising cell borders from an image document in accordance with some embodiments of the present disclosure.

The architecture 100 comprises data source $101_1$ to $101_n$ (also referred as one or more data sources 101) and a table detecting system 103. The one or more data sources 101 may include, but not limited to, at least one of an image capturing device such as a camera, a mobile and the like, and a repository. In some embodiments, the table detecting system 103 may receive a primary image document from a data source among the one or more data sources 101 via a communication network (not shown in the FIG. 1A). As an example, the primary image document may be a scanned document or a captured image document. As an example, the communication network may be at least one of a wired communication network and a wireless communication network.

The table detecting system 103 may include a processor 105, an Input/Output (I/O) interface 107 and a memory 109. The I/O interface 107 may receive and store the primary image document in the memory 109. The processor 105 may rescale the primary image document to generate plurality of secondary image documents. In some embodiments, the processor 105 may generate the plurality of secondary image documents by sequentially incrementing size of the primary image document by a predefined increment value until a threshold size is reached. As an example, the predefined increment value may be 10%. As an example, the threshold size may be two times original size of the primary image document. In some embodiments, an image document generated by the processor 105 at each sequential increment is the secondary image document and each secondary image document thus generated belong to different size and resolution.

Further, the processor 105 may detect a plurality of candidate regions comprising one or more predefined table features in each of the plurality of secondary image documents. In some embodiments, the different size and the resolution of each of the plurality of secondary image documents enable in accurate detection of plurality of candidate regions due to enlarged visibility of content of the primary image document. In some embodiments, the one or more predefined table features may include, but not limited to, an L-shaped edge (as shown in FIG. 1B (1)), laterally inverted L-shaped edge (as shown in FIG. 1B (2)), elongated L-shaped edge (as shown in FIG. 1B (3)), vertically inverted L-shaped edge (as shown in FIG. 1B (4)), T-junction (as shown in FIG. 1B (5)) and an intersection (as shown in FIG. 1B (6)). In some embodiments, the one or more predefined table features are detectable in different regions of a table. As an example, the L-shaped edge may be detected at bottom edge of the table, the intersection can be detected at every meeting point of a row and a column and the like.

Further, the processor 105 may determine a set of connected components corresponding to each of the plurality of candidate regions. In some embodiments, the processor 105 may determine the set of the connected components using any existing connected component technique. In some embodiments, each set of the connected components may include IDs associated with the corresponding connected components. Further, a common ID may be associated with the connected components that are interlinked. In some embodiments, the connected components are said to be interlinked when the connected components share continuous common pixels.

Furthermore, the processor 105 may determine IDs of the connected components, that are present in more than one set of the connected components determined above for each of the plurality of candidate regions. In some embodiments, the processor 105 may generate clusters of the connected components, such that each cluster may include the connected components corresponding to the IDs that are determined to be present in more than one set of the connected components. As an example, if the ID 2 is determined to be present in 5 sets of the connected components, the processor 105 may generate the cluster comprising the connected components corresponding to the ID 2, that were determined earlier at the plurality of candidate regions. In some embodiments, the processor 105 may discard the connected components corresponding to the plurality of candidate regions that are not present in more than one set of the connected components, before proceeding to determine existence of a table in the primary image document.

Further, the processor 105 may determine if the clusters of the connected components satisfy a predefined probability threshold. When the determination is positive, the processor 105 may infer that the corresponding clusters of the connected components form the table. In some embodiments, each such cluster of the connected components determined to satisfy the predefined probability threshold may be part of different tables in the primary image document. As an example, consider the cluster of the connected components with ID 2 is determined to satisfy the predefined probability threshold. Therefore, the processor 105 may infer that, the connected components with the ID 2 are part of one table in the primary image document. Similarly, if there exists another cluster of the connected components determined to satisfy the predefined probability threshold, then the processor 105 may infer existence of a second table in the primary image document and the connected components of that cluster form part of the second table in the primary image document. In some embodiments, the connected components that belong to the clusters satisfying the predefined probability threshold form borders, rows and columns of the corresponding table/s that are determined to exist in the primary image document.

When the table or tables are determined, the processor 105 may crop areas corresponding to the clusters of the connected components that are determined to form the table/s. In some embodiments, the processor 105 may discard the clusters of the connected components which do not satisfy the predefined probability threshold.

Further, the processor 105 may identify each cell region of the table/s by modifying pixel values of the clusters of the connected components in the cropped areas. In an embodiment, modifying the pixel values may include inverting the pixel values of the clusters of the connected components and the area enclosed by the clusters of the connected components. As an example, inverting the pixel values may include, but not limited to, converting the pixel value 0 to 255 (black pixels to white pixels) and the pixel value 255 to 0 (white pixels to black pixels).

Figure 2A:
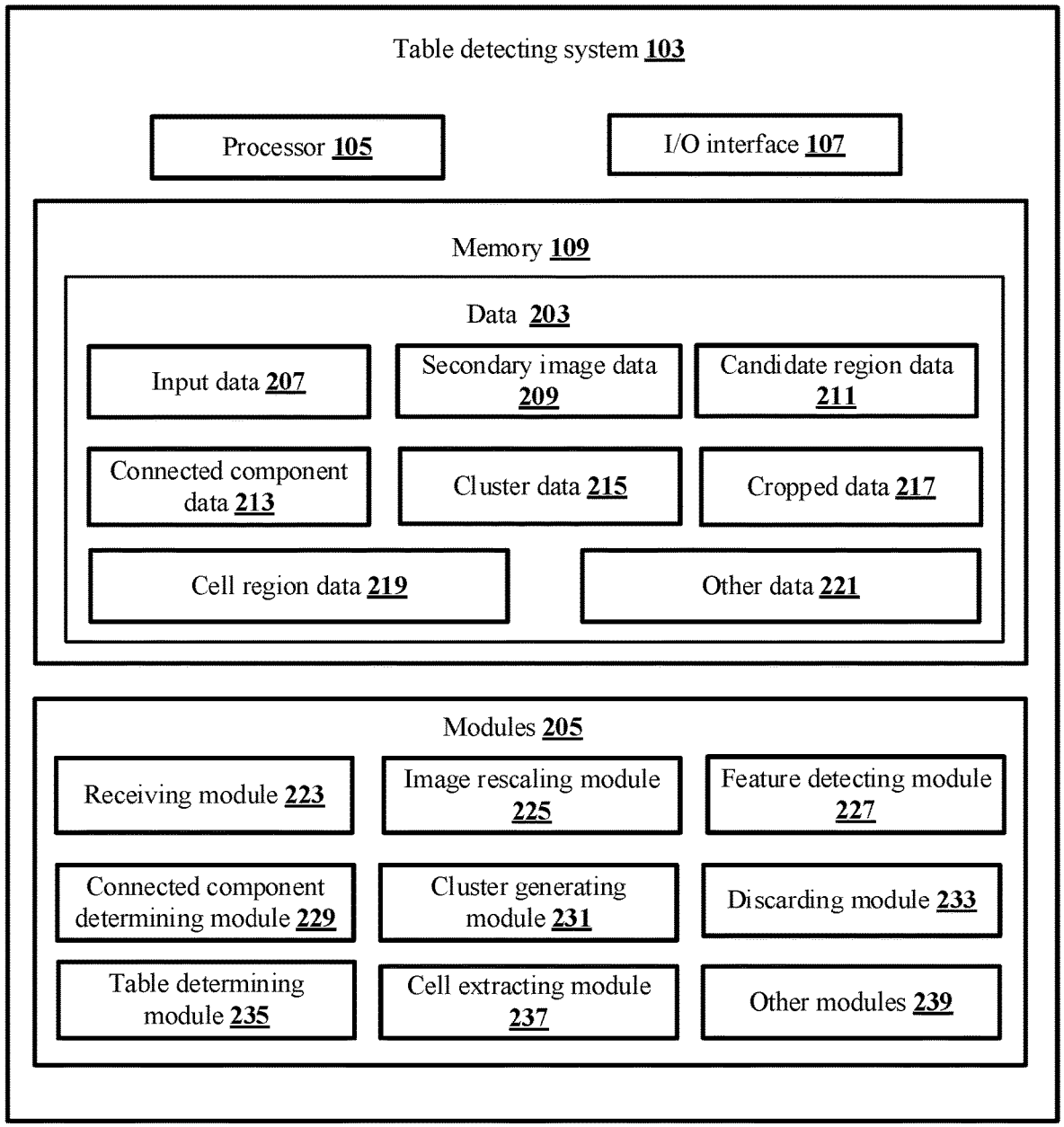
FIG. 2A shows a detailed block diagram of a table detecting system for identifying cell region of a table comprising cell borders from an image document in accordance with some embodiments of the present disclosure.

FIG. 2A shows a detailed block diagram of a table detecting system for identifying cell region of a table comprising cell borders from an image document in accordance with some embodiments of the present disclosure.

In some implementations, the table detecting system 103 may include data 203 and modules 205. As an example, the data 203 may be stored in a memory 109 configured in the table detecting system 103 as shown in the FIG. 2A. In one embodiment, the data 203 may include input data 207, secondary image data 209, candidate region data 211, connected component data 213, cluster data 215, cropped data 217, cell region data 219 and other data 221. In the illustrated FIG. 2A, modules 205 are described herein in detail.

In some embodiments, the data 203 may be stored in the memory 109 in form of various data structures. Additionally, the data 203 can be organized using data models, such as relational or hierarchical data models. The other data 221 may store data, including temporary data and temporary files, generated by the modules 205 for performing the various functions of the table detecting system 103.

In some embodiments, the data 203 stored in the memory 109 may be processed by the modules 205 of the table detecting system 103. The modules 205 may be stored within the memory 109. In an example, the modules 205 communicatively coupled to the processor 105 configured in the table detecting system 103, may also be present outside the memory 109 as shown in FIG. 2A and implemented as hardware. As used herein, the term modules 205 may refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a receiving module 223, an image rescaling module 225, a feature detecting module 227, a connected component determining module 229, a cluster generating module 231, a discarding module 233, a table determining module 235, a cell extracting module 237 and other modules 239. The other modules 239 may be used to perform various miscellaneous functionalities of the table detecting system 103. It will be appreciated that such aforementioned modules 205 may be represented as a single module or a combination of different modules.

In some embodiments, the receiving module 223 may receive a primary image document from a data source among one or more data sources 101 associated with the table detecting system 103. As an example, the primary image document may be a scanned document or a captured image document. The primary image document thus received may be stored as the input data 207.

Further, the image rescaling module 225 may rescale the primary image document to generate plurality of secondary image documents. In some embodiments, the image rescaling module 225 may sequentially increment size of the primary image document by a predefined increment value until a threshold size is reached. As an example, the predefined increment value may be 10%. As an example, the predefined increment value may also be a range of 1.5% to 10%. As an example, the threshold size may be two times original size of the primary image document. In some embodiments, an image document generated by the image rescaling module 225 at each sequential increment is the secondary image document and each secondary image document thus generated belong to different size and resolution. In some embodiments, the different size and resolution of each of the plurality of secondary image documents provide enlarged and clear visibility of content of the primary image document. The plurality of secondary images thus generated may be stored as the secondary image data 209.

Further, the feature detecting module 227 may detect a plurality of candidate regions including one or more predefined table features in each of the plurality of secondary image documents. As an example, the one or more predefined table features may include, but not limited to, L-shaped edge, laterally inverted L-shaped edge, elongated L-shaped edge, vertically inverted L-shaped edge, T-junction and an intersection. In some embodiments, the one or more predefined table features may be structures that may be identifiable in a bordered table having any type of structural arrangement of cells. In some embodiments, to detect the plurality of candidate regions, the feature detecting module 227 may initially perform cross-correlation of each of the one or more predefined table features with each of the plurality of secondary image documents. In some embodiments, the feature detecting module 227 may perform cross-correlation using predefined cross-correlation techniques. Based on the cross-correlation, the feature detecting module 227 may detect regions in each of the plurality of secondary images whose cross-correlation with the one or more predefined table features is higher than a predefined correlation threshold, as the plurality of candidate regions. As an example, the predefined correlation threshold may be 95%. In some embodiments, the plurality of candidate regions detected in each of the plurality of secondary images may be same, since each of the plurality of secondary images are rescaled versions of the primary image document. By detecting the plurality of candidate regions in each of the plurality of secondary images, the feature detecting module 227 ensures accurate detection of all the plurality of candidate regions present in the primary image document i.e. if any candidate region is not detected in one secondary image document, the feature detecting module 227 may detect that candidate region in another secondary image document due to enhanced and enlarged view of the content of the primary image document. In some other embodiments, the primary image document to may be rescaled to generate plurality of secondary image documents within a range of 1.5% to 10%, the feature detecting module 227 may perform morphological feature mapping/feature comparison (cross correlation) to detect the plurality of candidate regions within the primary image document where the cross-correlation is higher than the predefined correlation threshold. In some embodiments, the feature detecting module 227 may select top 3 candidate regions having highest correlation with the one or more predefined table features. The plurality of candidate regions detected by the feature detecting module 227 may be stored as the candidate region data 211.

Further, the connected component determining module 229 may determine a set of connected components corresponding to each of the plurality of candidate regions. In some embodiments, the connected component determining module 229 may determine the set of the connected components using any existing connected component technique. In some embodiments, each set of the connected components may include IDs associated with the corresponding connected components. Further, a common ID may be associated with the connected components that are interlinked. In some embodiments, the connected components are said to be interlinked when the connected components share continuous common pixels. The set of connected components determined for each of the plurality of candidate regions may be stored as the connected component data 213.

Referring to an exemplary secondary image document 111 in FIG. 2B (1), where detected predefined table features are indicated i.e. the dotted line indicates the L-shaped edge in a first candidate region and the bold line indicates the T-junction in a second candidate region. FIG. 2B(2) indicates the first candidate region and the FIG. 2B(3) indicates the second candidate region. Further, the set of connected components of the first candidate region are shown in FIG. 2C(1), FIG. 2C(2) and FIG. 2C(3). In FIG. 2C(1), two horizontal lines and one vertical line are formed by continuously arranged pixels, therefore, the two horizontal lines and one vertical line form a first connected component that may be associated with an exemplary ID "0". In FIG. 2C(2), strokes constituting letter "h" are formed by continuously arranged pixels, therefore, the strokes constituting the letter "h" form a second connected component that may be associated with an exemplary ID "1". Similarly, in FIG. 2C(3), strokes constituting letter "I" are formed by continuously arranged pixels, therefore, the strokes constituting the letter "I" form a third connected component that may be associated with an exemplary ID "2". Therefore, an exemplary set of connected components associated with the first candidate region may be as shown below:

Set(first candidate region)={0,1,2}

Further, the set of connected components of the second candidate region are shown in FIG. 2D(1), FIG. 2D(2) and FIG. 2D(3). Based on the above explanation, in FIG. 2D(1), two horizontal lines and two vertical lines form a first connected component in the second candidate region and the horizontal lines in the second candidate region share common pixels with the horizontal lines in the first candidate region. Therefore, the first connected component of the first candidate region and the first connected component of the second candidate region may be construed as interlinked, thus bearing the common ID "0". Further, in FIG. 2D(2), strokes constituting letter "A" are formed by continuously arranged pixels, therefore, the strokes constituting the letter "A" form a second connected component in the second candidate region that may be associated with an exemplary ID "3". Similarly, in FIG. 2D(3), strokes constituting letter "J" are formed by continuously arranged pixels, therefore, the strokes constituting the letter "J" form a third connected component in the second candidate region that may be associated with an exemplary ID "4". Therefore, an exemplary set of connected components associated with the second candidate region may be as shown below:

Set(second candidate region)={0,3,4}

Similarly, the connected component determining module 229 may determine the sets of the connected components for rest of the plurality of candidate regions.

Furthermore, the cluster generating module 231 may generate clusters of the connected components. To generate the clusters, the cluster generating module 231 may parse each set of the connected components to determine IDs of the connected components, that are present in more than one set of the connected components. In some embodiments, the processor 105 may generate clusters of the connected components, such that each cluster may include the connected components corresponding to the IDs that are determined to be present in more than one set of the connected components. Referring to sets determined in the above example, ID "0" is common in the set of the connected components determined for the first candidate region and the set of the connected components determined for the second candidate region. Therefore, the cluster generating module 231 may extract connected components associated with the ID "0" from the corresponding candidate regions and may form a cluster of the connected components associated with ID "0". In some embodiments, the clusters of the connected components generated by the cluster generating module 231 may be stored as the cluster data 215.

Upon generating the clusters of the connected components, the discarding module 233 may discard the connected components corresponding to the plurality of candidate regions that are not present in more than one set of the connected components, before proceeding to determine existence of the table in the primary image document. Referring to the above example, the connected components corresponding to ID "0" formed the cluster of the connected components. However, the connected components corresponding to the remaining IDs in each set of the connected components, which are not present in multiple sets may be discarded. In the above example, the IDs "1" and "2" belonging to the set of the first candidate region and the IDs "3" and "4" belonging to the set of the second candidate region are present in only one set i.e. the connected components corresponding to the IDs "1", "2", "3" and "4" do not interlink with any other connected components determined in the primary image document. Therefore, the discarding module 233 may discard the connected components corresponding to the IDs "1", "2", "3" and "4". This form of discarding may be referred as first level of discarding in the present disclosure.

Further, the table determining module 235 may check for existence of a table in the primary image document by determining if the clusters of the connected components satisfy a predefined probability threshold. Initially, the table determining module 235 may receive the clusters of the connected components determined by the cluster generating module 231 as input. Further, the table determining module 235 may evaluate a probability of forming the table for each cluster of the connected components using pre-trained deep learning techniques i.e. the probability may indicate whether the connected components of a certain cluster are part of the table. Upon determining the probability, the table determining module 235 may compare the probability corresponding to each cluster of the connected components with the predefined probability threshold. As an example, the predefined probability threshold may be 95%. In some embodiments, when the probability corresponding to the cluster of the connected components is determined to be satisfying the predefined probability threshold, in other words, when the probability is determined to be greater than the predefined probability threshold, the table determining module 235 may infer/confirm that the corresponding cluster of the connected components are part of the table, thereby confirming existence of the table in the primary image document.

In some embodiments, when the probability corresponding to the cluster of the connected components does not satisfy the predefined probability threshold, in other words, when the probability is determined to be less than or equal to the predefined probability threshold, the table determining module 235 may infer/confirm that the corresponding cluster of the connected components is not part of the table. In some embodiments, the discarding module 233 may discard the clusters of the connected components whose probability does not satisfy the predefined probability threshold. This form of discarding may be referred as second level of discarding in the present disclosure. In some embodiments, when there exists only one table in the primary image document, the probability corresponding to only one cluster of the connected components may satisfy the predefined probability threshold. In some embodiments, the number of clusters satisfying the predefined probability threshold may be equal to the number of tables present in the primary image document.

Further, the table determining module 235 may crop areas corresponding to the clusters of the connected components that are determined to form the table, from the primary image document. In some embodiments, the areas cropped from the primary image document may include the table. Further, each cluster of the connected components corresponding to each cropped area, may form cell borders (also referred as outline of each row and column) of the corresponding table. In some embodiments, the cell borders forming the table, may be solid line cell borders i.e. border style associated with the cell borders may be "solid line" which includes continuous arrangement of pixels. In some embodiments, the areas cropped from the primary image document may be stored as the cropped data 217.

Figure 2E:
FIG. 2E shows an exemplary table with borders in accordance with some embodiments of the present disclosure.
Figure 2F:
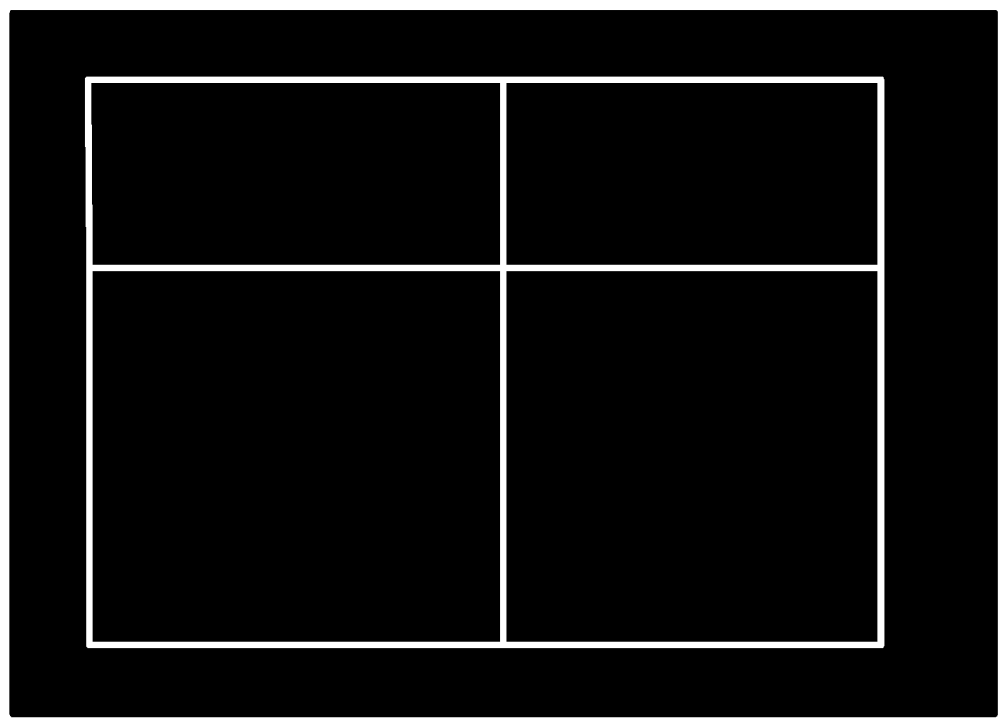
FIG. 2F shows an exemplary table obtained upon inversion of pixels in accordance with some embodiments of the present disclosure.

Further, the cell extracting module 237 may extract cell regions of the table. In some embodiments, the cell extracting module 237 may initially identify each cell region of the table by modifying pixel values of the clusters of the connected components in the cropped areas, in other words, the cell extracting module 237 may modify pixel values of the outline of each row and column of the table formed by the corresponding cluster of the connected components. As an example, modifying pixel values may include, but not limited to, inverting the pixel values of the clusters of the connected components and the area enclosed by the clusters of the connected components. As an example, inverting the pixel values may include, but not limited to, converting the pixel value 0 to 255 (black pixels to white pixels) and the pixel value 255 to 0 (white pixels to black pixels). In some embodiments, upon inverting the pixel values, the outline of each row and column of the table may appear in white and each cell region may appear in black. Further, the cell extracting module 237 may determine connected components corresponding to the black pixels obtained upon inversion. As an example, consider the table as shown in the FIG. 2E. The outline of each row and column of the table is constituted with black pixels and the cell regions within the outline and background of the table are constituted with white pixels. Upon inverting the pixel values, the outline of each row and column of the table that was earlier constituted with black pixel values, may be converted to white pixels. Similarly, the cell regions within the outline and background of the table that were earlier constituted with white pixels, may be converted to black pixels as shown in the FIG. 2F. When the cell extracting module 237 determines connected components of the black pixels upon inversion, each pixel within a cell region of the table may be continuously arranged, hence forming one connected component which may be associated with one ID. Therefore, each cell region may be determined as a unique connected component associated with unique IDs as shown in the FIGS. 2G (1)-(4). Therefore, the cell extracting module 237 may identify and extract each cell region of the table by extracting the determined connected components corresponding to the black pixels upon inversion. The cell regions thus extracted may be stored as cell region data 219.

Figure 2H:
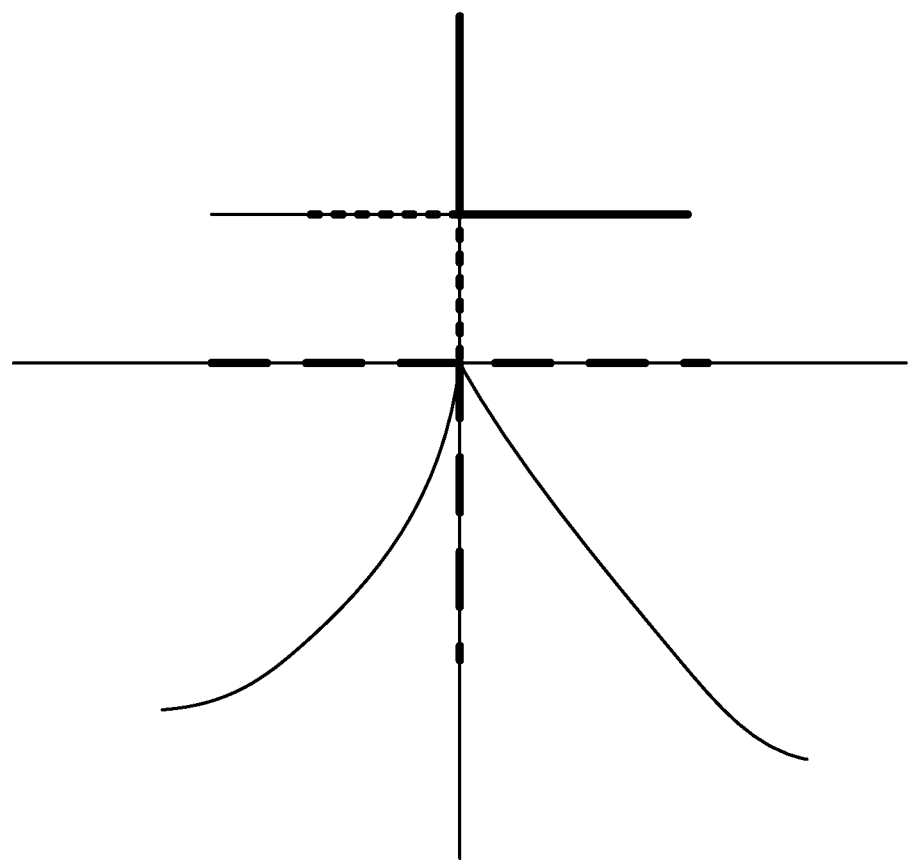
FIG. 2H shows an exemplary character resembling one or more predefined features in accordance with some embodiments of the present disclosure.

In some embodiments, consider the primary image document includes text that resembles the one or more predefined table features such as Chinese characters as shown in the FIG. 2H. The table detecting system 103 may initially detect the Chinese character as the candidate region and may surpass the first level of discarding, due to high correlation of the Chinese character with the one or more predefined table features as shown in FIG. 2H, in which, a bold line indicates L-shaped edge, small dotted line indicates vertically inverted L-shaped edge and a big dotted line indicates T-junction. However, when the table detecting system 103 generates the cluster of the connected components corresponding to the Chinese character, probability evaluated using the pre-trained deep learning techniques for the cluster may be less than the predefined probability threshold, thereby discarding the Chinese character.

Figure 3:
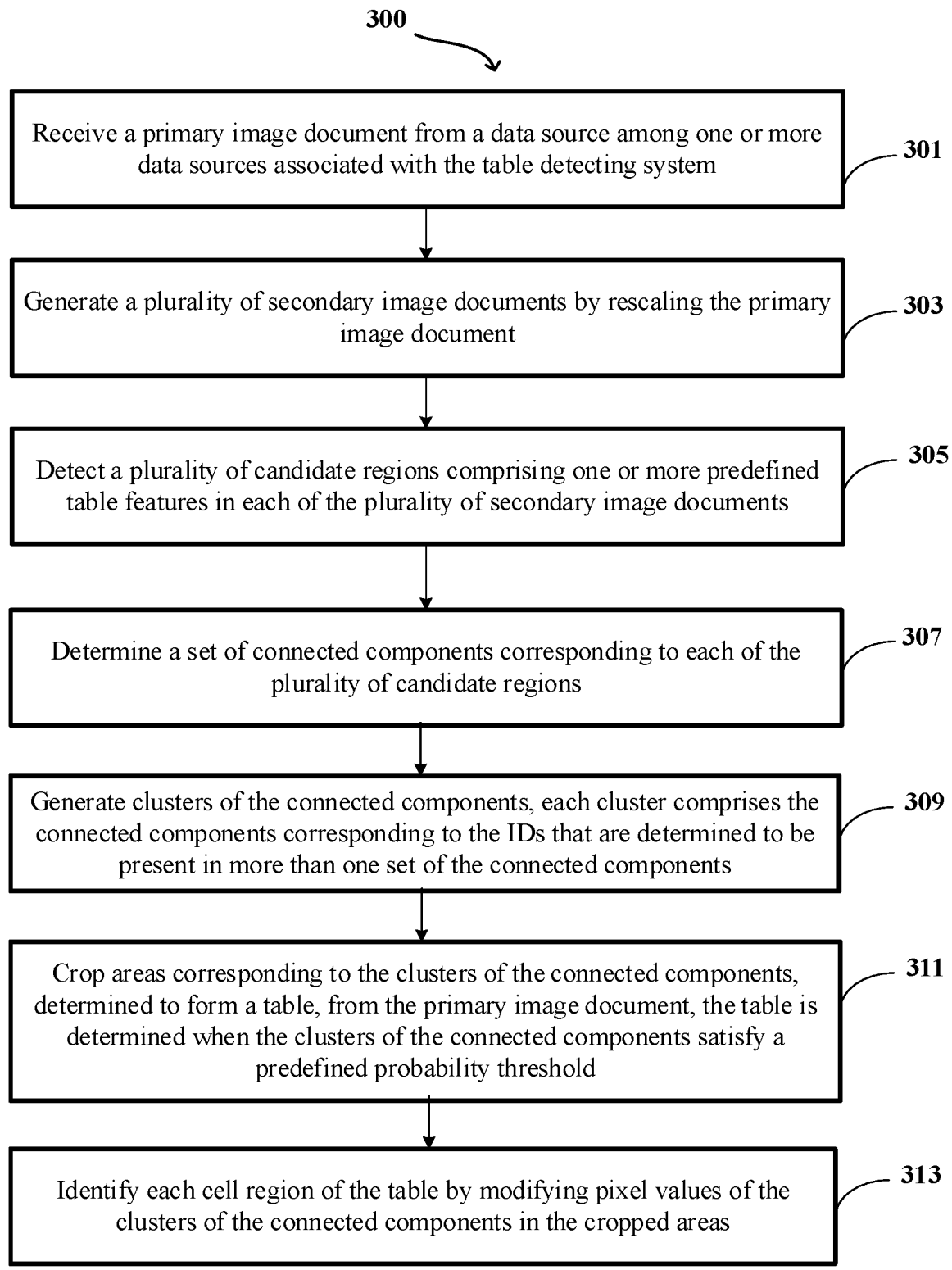
FIG. 3 shows a flowchart illustrating a method of identifying cell region of a table comprising cell borders from an image document in accordance with some embodiments of the present disclosure.

FIG. 3 shows a flowchart illustrating a method of identifying cell region of a table comprising cell borders from an image document in accordance with some embodiments of the present disclosure.

As illustrated in FIG. 3, the method 300 comprises one or more blocks illustrating a method of identifying cell region of a table comprising cell borders from an image document. In some embodiments, the cell borders forming the table, may be solid line cell borders i.e. border style associated with the cell borders may be "solid line" which includes continuous arrangement of pixels. The method 300 may be described in the general context of computer-executable instructions. Generally, computer-executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include receiving, by a processor 105 of the table detecting system 103, a primary image document from a data source among one or more data sources 101 associated with the table detecting system 103. In some embodiments, the one or more data sources 101 may include, but not limited to, an image capturing device such as a camera, a mobile and the like, and a repository.

At block 303, the method 300 may include generating, by the processor 105, a plurality of secondary image documents by rescaling the primary image document. In some embodiments, the processor 105 may generate the plurality of secondary image documents by sequentially incrementing size of the primary image document by a predefined increment value until a threshold size is reached.

At block 305, the method 300 may include detecting, by the processor 105, a plurality of candidate regions including one or more predefined table features in each of the plurality of secondary image documents. In some embodiments, the one or more predefined table features may include, but not limited to, L-shaped edge, laterally inverted L-shaped edge, elongated L-shaped edge, vertically inverted L-shaped edge, T-junction and an intersection.

At block 307, the method 300 may include determining, by the processor 105, a set of connected components corresponding to each of the plurality of candidate regions. In some embodiments, each set of the connected components comprises IDs associated with the corresponding connected components. The connected components that are interlinked may be associated with a common ID.

At block 309, the method 300 may include generating, by the processor 105, clusters of the connected components. In some embodiments, each cluster comprises the connected components corresponding to the IDs that are determined to be present in more than one set of the connected components.

At block 311, the method 300 may include cropping, by the processor 105, areas corresponding to the clusters of the connected components, determined to form a table, from the primary image document. In some embodiments, the table is determined when the clusters of the connected components satisfy a predefined probability threshold.

At block 313, the method 300 may include identifying, by the processor 105, each cell region of the table by modifying pixel values of the clusters of the connected components in the cropped areas. In some embodiments, modifying the pixel values may include inverting the pixel values of the clusters of the connected components and the area enclosed by the clusters of the connected components. As an example, inverting the pixel values may include, but not limited to, converting the pixel value 0 to 255 (black pixels to white pixels) and the pixel value 255 to 0 (white pixels to black pixels).

Figure 4:
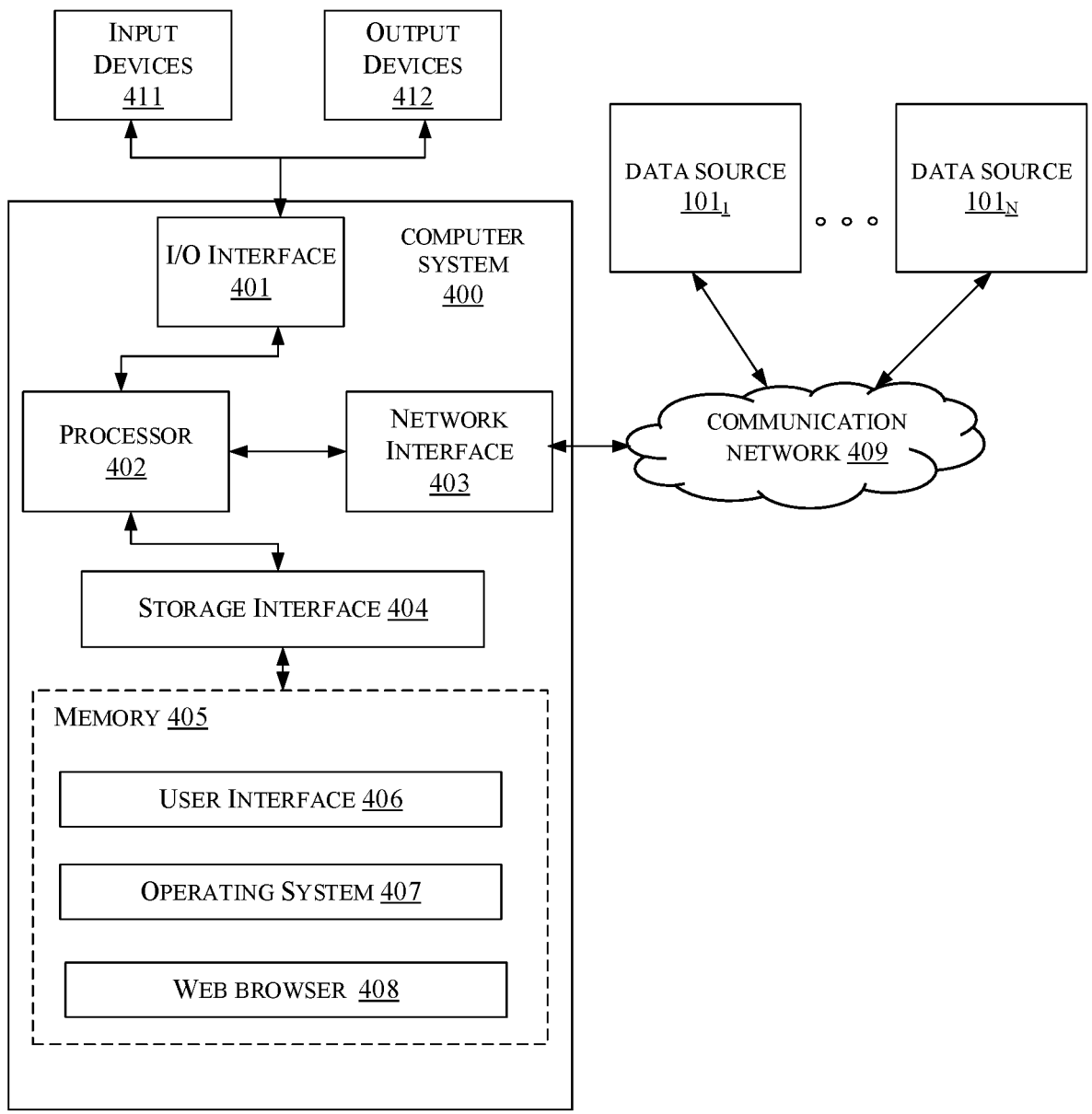
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention. In some embodiments, the computer system 400 can be table detecting system 103 that is used for identifying cell region of a table comprising cell borders from an image document. The computer system 400 may include a central processing unit ("CPU" or "processor") 402. The processor 402 may include at least one data processor for executing program components for executing user or system-generated business processes. A user may include a person, a person using a device such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the computer system 400 may communicate with the input devices 411 and the output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more data sources 101 ($101_1$ up to $101_n$. The one or more data sources 101 may include, but not limited to, an image capturing device such as a camera, a mobile and the like, and a repository. The communication network 409 can be implemented as one of the different types of networks, such as intranet or Local Area Network (LAN), Closed Area Network (CAN) and such. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, checkboxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

The present disclosure discloses a method and a system for identifying cell region of a table comprising cell borders from an image document. The present disclosure determines the outline of the rows and columns of the table, and also identifies exact cell regions of the table, such that, the relational structure of the table remains intact and prevents misleading arrangement of information present in the table.

The claimed steps of the present disclosure are not routine conventional or well understood in the art, as the claimed steps enable the following solutions to the existing problems in conventional technologies. In order to efficiently and accurately detect the table and cell region within the table, the conventional technologies do not take the following into account:

Rescaling of the primary image document to generate plurality of secondary image documents. Each of the plurality of secondary images have a different size and resolution, that provide an enlarged visibility of content of the primary image document that enable in accurate detection of plurality of candidate regions. The plurality of secondary images eliminates the possibility of missing out detection of few candidate regions due to reasons such as clarity of the image document, size of content in the image document and the like. The one or more predefined table features disclosed in the present disclosure provide the technical advantage of determining a table in the scanned document or the image document irrespective of structural arrangement of cells formed by rows and columns of the table.

Generating clusters of the connected components whose IDs are determined to be present in more than one set of the connected components. This step of generating the clusters selects only the connected components that are interlinked i.e. the connected components which share common pixels and may have a probability of forming the table. By selecting the only the interlinked connected components, the present disclosure performs first level of filtering at this stage by discarding all the connected components that are not interlinked with any other connected components. The first level of filtering helps in eliminating plurality of candidate regions that would not contribute in determining existence of the table. Further, the first level of filtering reduces the number of clusters of the connected components that are subjected to analysis by pre-trained deep learning techniques, thereby reducing time and resources required for performing high level computations of pre-trained deep learning techniques. This in turn improves the functioning of the computer system itself due to reduced computational burden and sufficient availability of the resources.

Cropping areas corresponding to the clusters of the connected components that are determined to form the table. The determination is performed based on pre-trained deep learning techniques that help in second level of filtering by discarding the clusters of the connected components whose probability of forming the table is less than a predefined probability threshold. This second level of filtering enables accurate detection of presence of the table in the primary image document and corresponding outline of the rows and columns of the table.

Identifying and extracting cell region of the table by inverting pixel values of the clusters of the connected components. This inversion of pixel values helps in identifying exact cell regions within the table by using connected components technique on the inverted pixels.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for identifying cell region of a table comprising cell borders from an image document. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A method of identifying cell region of a table comprising cell borders from an image document, the method comprising:
   receiving, by a table detecting device, a primary image document from a data source among one or more data sources associated with the table detecting system;
   generating, by the table detecting device, a plurality of secondary image documents by rescaling the primary image document;
   detecting, by the table detecting device, a plurality of candidate regions comprising one or more predefined table features in each of the plurality of secondary image documents, wherein the one or more predefined table features comprises at least one of L-shaped edge, laterally inverted L-shaped edge, elongated L-shaped edge, vertically inverted L-shaped edge, T-junction and an intersection;
   determining, by the table detecting device, a set of connected components corresponding to each of the plurality of candidate regions, wherein each set of the connected components comprises IDs associated with the corresponding connected components, wherein a common ID is associated with the connected components that are interlinked;
   generating, by the table detecting device, clusters of the connected components, wherein each cluster comprises the connected components corresponding to the IDs that are determined to be present in more than one set of the connected components;
   cropping, by the table detecting device, areas corresponding to the clusters of the connected components, determined to form a table, from the primary image document, wherein the table is determined when the clusters of the connected components satisfy a predefined probability threshold; and
   identifying, by the table detecting device, each cell region of the table by modifying pixel values of the clusters of the connected components in the cropped areas.

2. The method as claimed in claim 1, wherein the rescaling comprises sequentially incrementing size of the primary image document by a predefined increment value until a threshold size is reached, wherein image document generated at each sequential increment is the secondary image document, wherein size of each of the plurality of secondary image documents is different.

3. The method as claimed in claim 1, wherein detecting the plurality of candidate regions comprises:
   performing, by the table detecting device, cross-correlation of each of the one or more predefined table features with each of the plurality of secondary image documents; and
   detecting, by the table detecting device, regions in each of the plurality of secondary images whose cross-correlation with the one or more predefined table features is higher than a predefined correlation threshold, as the plurality of candidate regions.

4. The method as claimed in claim 1, wherein determining the table comprises:

evaluating, by the table detecting device, a probability of forming the table for each cluster of the connected components using pre-trained deep learning techniques; and inferring, by the table detecting device, that the cluster of the connected components form the table when the probability is determined to be greater than the predefined probability threshold.

5. The method as claimed in claim 4 further comprises discarding, by the table detecting device, the clusters of the connected components whose probability of forming the table is determined to be less than the predefined probability threshold.

6. The method as claimed in claim 1 further comprises discarding, by the table detecting device, the connected components corresponding to each of the plurality of candidate regions that are not present in more than one set of the connected components, before determining existence of the table.

7. The method as claimed in claim 1, wherein each area cropped from the primary image document comprises the table and each cluster of the connected components in the area forms outline of each row and column of the corresponding table.

8. The method as claimed in claim 1, wherein modifying the pixel values comprises inverting the pixel values of the clusters of the connected components and the area enclosed by the clusters of the connected components.

9. The method as claimed in claim 1, wherein each cell region of the table is identified by determining connected components of the area enclosed by the clusters of the connected components that are determined to form the table, upon modifying the pixel values.

10. A table detecting device comprising:
a processor; and
a memory communicatively coupled to the processor, wherein the memory stores the processor-executable instructions, which, on execution, causes the processor to:
receive a primary image document from a data source among one or more data sources associated with the table detecting system;
generate a plurality of secondary image documents by rescaling the primary image document;
detect a plurality of candidate regions comprising one or more predefined table features in each of the plurality of secondary image documents, wherein the one or more predefined table features comprises at least one of L-shaped edge, laterally inverted L-shaped edge, elongated L-shaped edge, vertically inverted L-shaped edge, T-junction and an intersection;
determine a set of connected components corresponding to each of the plurality of candidate regions, wherein each set of the connected components comprises IDs associated with the corresponding connected components, wherein a common ID is associated with the connected components that are interlinked;
generate clusters of the connected components, wherein each cluster comprises the connected components corresponding to the IDs that are determined to be present in more than one set of the connected components;
crop areas corresponding to the clusters of the connected components, determined to form a table, from the primary image document, wherein the table is determined when the clusters of the connected components satisfy a predefined probability threshold; and
identify each cell region of the table by modifying pixel values of the clusters of the connected components in the cropped areas.

11. The table detecting device as claimed in claim 10, wherein the processor rescales the primary image document by sequentially incrementing size of the primary image document by a predefined increment value until a threshold size is reached, wherein image document generated at each sequential increment is the secondary image document.

12. The table detecting device as claimed in claim 10, wherein size of each of the plurality of secondary image documents is different.

13. The table detecting device as claimed in claim 10, wherein to detect the plurality of candidate regions, the processor is configured to:
perform cross-correlation of each of the one or more predefined table features with each of the plurality of secondary image documents; and
detect regions in each of the plurality of secondary images whose cross-correlation with the one or more predefined table features is higher than a predefined correlation threshold, as the plurality of candidate regions.

14. The table detecting device as claimed in claim 10, wherein to determine the table, the processor is configured to:
evaluate a probability of forming the table for each cluster of the connected components using pre-trained deep learning techniques; and
infer that the cluster of the connected components form the table when the probability is determined to be greater than the predefined probability threshold.

15. The table detecting device as claimed in claim 10, wherein the processor is further configured to discard the clusters of the connected components whose probability of forming the table is determined to be less than the predefined probability threshold.

16. The table detecting device as claimed in claim 11, wherein the processor is further configured to discard the connected components corresponding to the plurality of candidate regions that are not present in more than one set of the connected components, before determining existence of the table.

17. The table detecting device as claimed in claim 11, wherein each area cropped from the primary image document comprises the table and each cluster of the connected components forms outline of each row and column of the corresponding table.

18. The table detecting device as claimed in claim 11, wherein the processor modifies the pixel values by inverting the pixel values of the clusters of the connected components and the area enclosed by the clusters of the connected components.

19. The table detecting device as claimed in claim 11, wherein the processor identifies each cell region of the table by determining connected components of the area enclosed by the clusters of the connected components that are determined to form the table, upon modifying the pixel values.

20. A non-transitory computer readable medium including instructions stored thereon that when processed by at least one processor causes a table detecting system to perform operations comprising:
receiving a primary image document from a data source among one or more data sources associated with the table detecting system;
generating a plurality of secondary image documents by rescaling the primary image document;

detecting a plurality of candidate regions comprising one or more predefined table features in each of the plurality of secondary image documents, wherein the one or more predefined table features comprises at least one of L-shaped edge, laterally inverted L-shaped edge, elongated L-shaped edge, vertically inverted L-shaped edge, T-junction and an intersection;

determining a set of connected components corresponding to each of the plurality of candidate regions, wherein each set of the connected components comprises IDs associated with the corresponding connected components, wherein a common ID is associated with the connected components that are interlinked;

generating clusters of the connected components, wherein each cluster comprises the connected components corresponding to the IDs that are determined to be present in more than one set of the connected components;

cropping areas corresponding to the clusters of the connected components, determined to form a table, from the primary image document, wherein the table is determined when the clusters of the connected components satisfy a predefined probability threshold; and identifying each cell region of the table by modifying pixel values of the clusters of the connected components in the cropped areas.

\* \* \* \* \*